(12) United States Patent
Silberbauer

(10) Patent No.: US 11,982,381 B2
(45) Date of Patent: May 14, 2024

(54) PIPE COUPLING

(71) Applicant: AVS, Ingenieur J.C. Römer GmbH, Grafenau (DE)

(72) Inventor: Günther Silberbauer, Grafenau (DE)

(73) Assignee: AVS, Ingenieur J.C. Römer GmbH, Grafenau (DE)

( * ) Notice: Subject to any disclaimer, the term of this patent is extended or adjusted under 35 U.S.C. 154(b) by 82 days.

(21) Appl. No.: 17/728,594

(22) Filed: Apr. 25, 2022

(65) Prior Publication Data
US 2022/0349505 A1 Nov. 3, 2022

(30) Foreign Application Priority Data
Apr. 29, 2021 (EP) .................................... 21171273

(51) Int. Cl.
*F16J 15/02* (2006.01)
*F16L 21/03* (2006.01)
*F16L 21/04* (2006.01)

(52) U.S. Cl.
CPC ............. *F16L 21/04* (2013.01); *F16J 15/022* (2013.01); *F16L 21/03* (2013.01)

(58) Field of Classification Search
CPC ........... F16L 21/04; F16L 21/03; F16J 15/022
See application file for complete search history.

(56) References Cited

U.S. PATENT DOCUMENTS

| | | | | |
|---|---|---|---|---|
| 1,822,056 A | * | 9/1931 | Noble | H02G 3/065 |
| | | | | 285/179 |
| 2,889,183 A | * | 6/1959 | Peras | F16J 15/3204 |
| | | | | 277/455 |
| 4,123,090 A | * | 10/1978 | Kotsakis | F16L 37/0915 |
| | | | | 285/39 |
| 4,593,943 A | * | 6/1986 | Hama | F16L 37/0915 |
| | | | | 285/308 |
| 4,749,214 A | * | 6/1988 | Hoskins | F16L 37/0987 |
| | | | | 285/379 |
| 5,205,568 A | * | 4/1993 | Stoll | F16J 15/3232 |
| | | | | 285/104 |
| 6,464,266 B1 | * | 10/2002 | O'Neill | B29C 66/52298 |
| | | | | 285/40 |

(Continued)

FOREIGN PATENT DOCUMENTS

| | | |
|---|---|---|
| CN | 104390079 A | 3/2015 |
| EP | 3770475 A1 | 1/2021 |

(Continued)

*Primary Examiner* — Vishal A Patel
(74) *Attorney, Agent, or Firm* — Christensen O'Connor Johnson Kindness PLLC

(57) ABSTRACT

A pipe coupling comprising a housing with a receiving space for a pipe section, with fixing members for releasably fixing the pipe section in the housing, and a sealing element which is arranged in the receiving space and is designed to surround the free end of the pipe section received in the receiving space on the outer circumferential side and thereby seal the interface between the housing and the pipe section in a fluid-tight manner. The pipe coupling is characterized in that the sealing element is designed in the form of a sleeve with a first and a second free end, in that a bulge is provided at the first free end, and in that a tubular section protrudes from the bulge and forms the second free end on the edge side.

15 Claims, 3 Drawing Sheets

(56) References Cited

U.S. PATENT DOCUMENTS

| | | | |
|---|---|---|---|
| 6,502,866 B1 * | 1/2003 | Hujisawa | ............ F16L 37/0842 |
| | | | 285/903 |
| 10,982,798 B2 | 4/2021 | Atkinson et al. | |
| 2004/0262920 A1 | 12/2004 | Le Quere | |
| 2019/0011065 A1 * | 1/2019 | Atkinson | .............. F16L 13/142 |
| 2019/0195401 A1 | 6/2019 | Wang | |

FOREIGN PATENT DOCUMENTS

| | | |
|---|---|---|
| IE | 960692 A1 | 4/1998 |
| JP | 2001082650 A | 3/2001 |

* cited by examiner

PIPE COUPLING

CROSS-REFERENCE TO RELATED APPLICATION

This application claims priority to European Application Number 21171273.2, filed Apr. 29, 2021, the disclosure of which is hereby incorporated by reference.

FIELD

The invention relates to a pipe coupling for connecting a pipe, in particular a flexible hose, to a further pipe or to a component, for example a valve, a distributor, a pump, etc.

BACKGROUND

Pipe couplings of this type are already known, for example as single couplings or with several outlets, in straight, angular design or also as a T-piece. They have a housing with a receiving area into which the free end of a pipe is inserted. The pipe coupling has a clamping device by means of which the pipe is secured against being pulled out of the pipe coupling in an undesired way or against being pressed out from the inside due to the overpressure applied. This clamping device can be released manually so that the pipe can be pulled out of the pipe coupling again. A sealing element can be provided to seal the interface between the pipe and the housing.

A major disadvantage of known pipe couplings is that they form dead spaces between the free end of the pipe, the sealing element and the housing. Dead spaces of this type are particularly undesirable in hygiene-sensitive applications, for example in food technology or medical technology, since they can lead to decontaminations of the conveyed medium.

Publication US 2004/0262920 A1 discloses a pipe coupling with reduced dead spaces.

However, a disadvantage of such seals, as shown e.g. in US 2004/0262920 A1, is that leaks can result if the pipe section protruding from the pipe coupling is bent or otherwise deformed.

SUMMARY

Based on this, an object of the present disclosure is to provide a pipe coupling that is designed to be as free of dead space as possible while at the same time maintaining a high degree of tightness.

According to one aspect, the present disclosure relates to a pipe coupling. The pipe coupling comprises a housing with a receiving space for a pipe section. Furthermore, fixing members are provided for releasably fixing the pipe section in the housing. In addition, the pipe coupling has a sealing element which is arranged in the receiving space and is designed to surround the outer circumference of the free end of the pipe section received in the receiving space, thereby sealing the interface between the housing and the pipe section in a fluid-tight manner. The sealing element is formed in a sleeve shape with a first and a second free end. The first end of the seal faces an inlet opening of the pipe coupling, via which a pipe to be sealed with respect to the housing can be introduced into the receiving space. A bulge is provided at the first free end. This bulge surrounds the pipe inserted into the receiving space, for example on the circumference side. A tubular section protrudes from the bulge and forms the second free end on the edge side.

The technical advantage of the pipe coupling is that a reduction of the dead space is achieved by the tubular section of the sealing element and, moreover, a high degree of tightness of the pipe coupling is achieved due to the bulge.

According to an exemplary embodiment, the tubular section of the sealing element is designed to be conically tapered on the inside towards the second free end, at least in the installed state of the sealing element, i.e. the inner diameter of the tubular section is reduced in the direction of the second free end. The conical taper can be achieved either in that the sealing element itself, i.e. even if it is not received in the housing of the pipe coupling, has an internal conical shape of this type. Alternatively, the conical taper can also be achieved by the housing of the pipe coupling, i.e. the seal is radially upset during the installation in the housing in such a way that the inner diameter of the tubular section is reduced in the direction of the second free end. Due to the conical shape of the tubular section, a high degree of tightness is achieved even if the pipe protruding from the pipe coupling is bent or otherwise deformed.

According to an exemplary embodiment, the bulge has the shape of an O-ring. In other words, the bulge has a circular main shape with a circular or substantially circular cross-section. This creates a sealing plane that guarantees a high level of leakage safety. When the seal is installed, this bulge is provided at a distance from the free end of the pipe, as seen in the axial direction of the pipe. In particular, the bulge is provided between a stop against which the free end of the pipe rests and the insertion opening of the pipe coupling.

The bulge preferably has a cross-sectional diameter which is greater than the wall thickness of the tubular section in a region immediately adjacent to the bulge. As a result, internal and external protrusion of the bulge can be achieved, which offers advantages in sealing the interface between the sealing element and the housing and the interface between the sealing element and the pipe section.

According to an exemplary embodiment, the tubular section has a constant outer diameter in the region of the second free end as viewed in the longitudinal direction. As a result, in the case of a cylindrical recess provided in the housing for the tubular section, a high degree of tightness can be achieved while at the same time avoiding dead spaces.

According to an exemplary embodiment, the sealing element is held in the housing in a clamping manner in such a way that the tubular section, the outer diameter of which, as seen in the longitudinal direction, expands conically towards the second free end, when the sealing element is not installed in the housing, is radially compressed when the sealing element is installed, resulting in a reduced inner diameter of the tubular section when the sealing element is installed. A tubular section that expands conically towards the second free end can thus be radially deformed by the housing of the pipe coupling in such a way that the inner diameter of the tubular section tapers conically towards the second free end, thereby achieving a high degree of tightness of the pipe coupling.

According to another exemplary embodiment, the tubular section is designed to be conically tapered on the outside towards the second free end. As a result, a circumferential gap can be formed between the sealing element and the housing, into which the material of the tubular section of the sealing element can escape when the pipe section is inserted into the sealing element.

According to an exemplary embodiment, the inside conical taper of the sealing element is achieved by a wall thickness of the tubular section increasing in the axial direction towards the second end. Alternatively, in the case of an outside conical taper, the inside conical taper can be achieved by a constant or substantially constant wall thickness in the axial direction.

According to an exemplary embodiment, the tubular section of the sealing element is designed to guide and radially support the free end of the pipe section when the latter is inserted into the receiving space. In other words, the tubular section of the sealing element forms a quasi sleeve-like guide for the pipe section. This makes it easy to insert the pipe section while at the same time ensuring a high level of tightness of the pipe coupling.

According to an exemplary embodiment, a bead is provided on the inside of the sealing element in the transition area between the bulge and the tubular section. This bead has the advantage that displaced material can escape into this bead when the pipe section is inserted into the sealing element.

According to an exemplary embodiment, the tubular section has at least one detent lug on the outside. By means of this detent lug, an interlocking fit can be achieved between the housing and the sealing element. As a result, an undesired incorrect placement of the sealing element, for example by pulling out the pipe, can be effectively avoided.

According to an exemplary embodiment, the detent lug is formed by a circumferential bead. A ribbing corresponding with this bead can be formed in the housing, into which the bead can be immersed so that an interlocking fit is achieved between the sealing element and the housing.

According to an exemplary embodiment, the receiving space has an annular stop for the free end of the pipe section, i.e. the free end of the pipe section comes to rest against this stop when the pipe is pushed into the pipe coupling. The annular stop simultaneously forms a stop for the second free end of the sealing element, i.e. the second free end of the sealing element rests against the annular stop. Preferably, the annular stop has no step and lies in a plane perpendicular to the longitudinal axis, so that the second free end of the sealing element and the free end of the pipe section are arranged in a common plane. Thus, a significant reduction of the dead space is achieved.

According to an exemplary embodiment, the length of the tubular section is greater than the cross-sectional diameter of the bulge. If this geometric relationship is observed, a high sealing effect can be achieved in the region of the tubular section of the sealing element since the pipe section inserted into the tubular section has a significant length.

According to an exemplary embodiment, the sealing element is formed in one piece.

According to another exemplary embodiment, the sealing element is formed in multiple parts, namely by a first sealing element part in the form of the bulge and a second sealing element part in the form of the tubular section.

According to an exemplary embodiment, a chamfer or recess is provided on the outside of the tubular section in the region of its free end. This chamfer or recess has the advantage that when the pipe section is inserted into the tubular section of the sealing element, tilting occurs due to displacement of the material in the region of the free end. This tilting leads to an increase in the contact pressure on the stop against which the sealing element rests on the free end side and thus to a higher degree of tightness in this region, so that flowing behind the tubular section in the region of its free end can be effectively avoided.

In the sense of the present disclosure, the expressions "approximately", "substantially" or "about" mean deviations from the respective exact value by +/−10%, preferably by +/−5% and/or deviations in the form of changes that are insignificant for the function.

Further developments, advantages and possible applications of the present disclosure also result from the following description of exemplary embodiments and from the drawings. In this connection, all the features described and/or illustrated are in principle the subject matter of the present disclosure, either individually or in any combination, irrespective of their summary in the claims or their back-reference. Furthermore, the content of the claims is made a part of the description.

BRIEF DESCRIPTION OF THE DRAWINGS

The invention will be explained in more detail below with reference to multiple drawings by means of exemplary embodiments. In the drawings.

DETAILED DESCRIPTION

Figure 1:
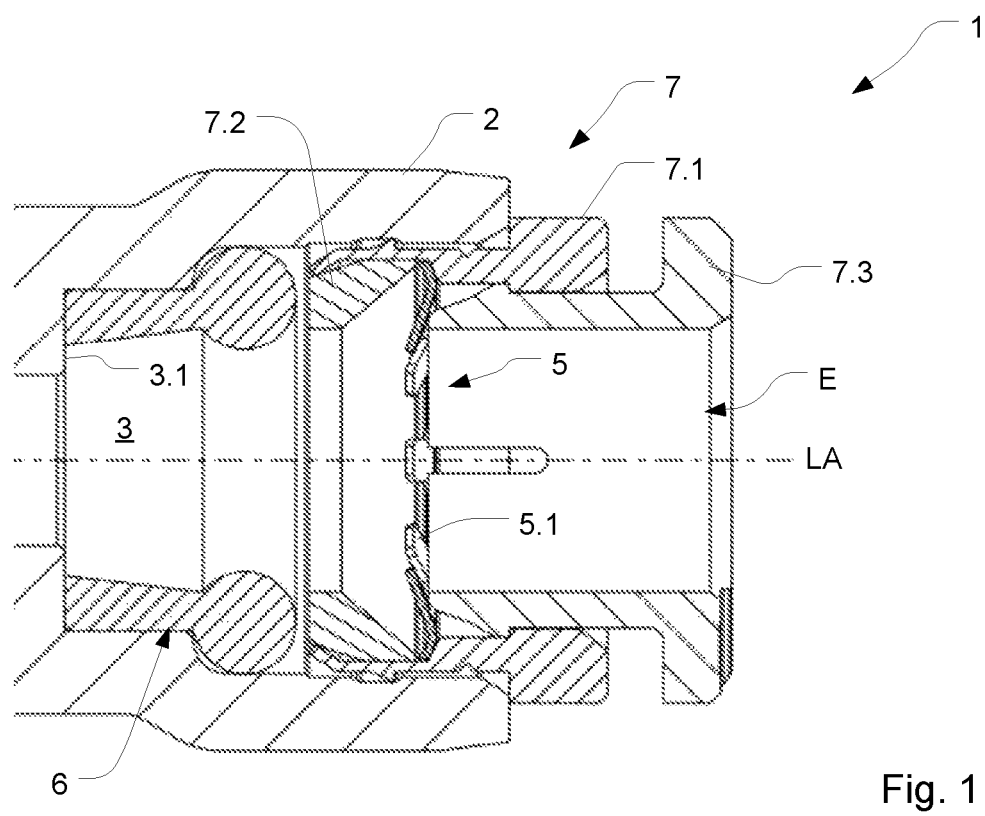
FIG. 1 shows, by way of example, a longitudinal section through a pipe coupling without inserted pipe end.

FIG. 1 shows a sectional view through a pipe coupling 1 along its longitudinal axis LA. The pipe coupling 1 is designed to establish a connection of a free pipe end to a component, for example a valve, or a pipe end of a further pipe section. For example, the pipe coupling can also be designed as a plug insert or screw insert which is screwed or pressed into a housing of a component, e.g. a valve. For example, the pipe can be a flexible hose.

The pipe coupling 1 has a housing 2 into which a pipe section 4, in particular the free pipe end of a pipe, can be inserted. The pipe coupling 1 has a substantially rotationally symmetrical structure with respect to the longitudinal axis LA.

The housing 2 has a receiving space 3 with an inlet opening E, via which a free end of a pipe section 4 can be introduced into the housing 2 of the pipe coupling 1. A clamping device 7 is provided in the receiving space 3. The clamping device 7 allows the free end of a pipe section 4 to be detachably connected to the pipe coupling 1, in particular in such a way that the free end of the pipe section 4 can be pulled out of the pipe coupling 1 again only after a release mechanism of the clamping device 7 has been actuated.

The clamping device K comprises a sleeve 7.1 which is inserted into the receiving space 3. A support ring 7.2 is coupled to the sleeve 7.1, for example in such a way that the sleeve 7.1 surrounds the support ring 7.2 on the outside at least in sections.

The clamping device 7 further comprises fixing members 5, by means of which the pipe section 4 is secured against unwanted detachment. For example, the fixing members 5 are arranged between the sleeve 7.1 and the support ring 7.2, viewed in the direction of the longitudinal axis LA, and are preferably held in a clamping manner between the sleeve 7.1 and the support ring 7.2, so that they are secured in their axial position in the housing 2. The fixing members 5 can be designed, for example, as a claw ring. The support ring 7.2 is supported in the axial direction, for example, on a sealing element 6, which in turn is supported on a stop 3.1. The stop 3.1 is formed e.g. by a shoulder or a step in the housing 3.

Figure 2:
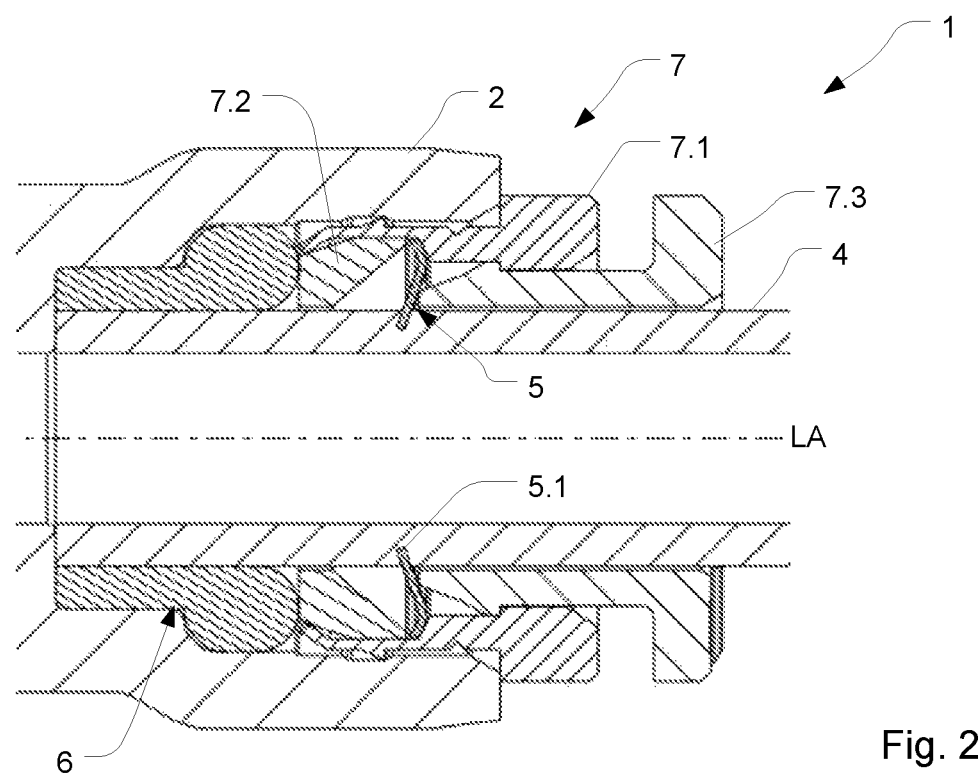
FIG. 2 shows, by way of example, a longitudinal section through a pipe coupling with inserted pipe end.

As shown in FIG. 2, the stop 3.1 simultaneously forms a contact surface for the free end of the pipe section 4 inserted into the receiving space 3. Preferably, the stop 3.1 is formed by a ring-like surface running perpendicular to the longitudinal axis LA and forming a stop for the sealing element 6 and the free end of the pipe section 4 at the same height, as seen in the axial direction.

The clamping device 7 further comprises a release ring 7.3, via which the fixing of the pipe section 4 in the pipe coupling 1 can be deactivated. The release ring 7.3 can, for example, be inserted in the sleeve 7.1. In particular, the release ring 7.3 can be fixed in the sleeve 7.1 by a latching mechanism to prevent detachment, but can be held in the sleeve 7.1 so as to be movable in the axial direction.

The clamping device 7 is preferably fixed in the housing 2 also by a latching mechanism. In particular, the sleeve 7.1 can have latching members on the outside, via which the sleeve 7.1 is held in a latched manner in the housing 2. The other components of the clamping device 7, i.e. the support ring 7.2, the fixing members 5 and the release ring 7.3, are indirectly fixed in the housing 2 by means of the sleeve 7.1. Here, the support ring 7.2 and the fixing members 5 rest against one another and are each supported on shoulders formed in the sleeve 7.1, so that the support ring 7.2 and the fixing members 5 are thereby fixed in the sleeve 7.1 in a clamping manner.

In order to assemble the clamping device 7, the sleeve 7.1, the support ring 7.2, the fixing members 5 and the release ring 7.3 can be pre-assembled outside the housing 2 and then be inserted together in the assembled state into the receiving space 3.

In order to fix the pipe section 4, it is inserted with its free end into the release ring 7.3 and advanced in the axial direction guided by the sealing element 6 described below until the free end of the pipe section 4 rests against the stop 3.1.

As can be seen in particular in FIG. 1, the fixing members 5 have radially inwardly projecting claws 5.1. These claws 5.1 are arranged so as to be inclined with respect to a plane aligned perpendicular to the longitudinal axis LA. As a result, it is possible to push the pipe section 4 from the inlet opening E into the receiving space 3, but unintentional detachment of the pipe section 4 is effectively prevented by the engagement of the claws 5.1 in the wall of the pipe section 4.

The release ring 7.3 is designed to release the engagement of the claws 5.1 in the wall of the pipe section 4 so that the pipe section 4 can be pulled out of the receiving space again. The release ring 7.3 is here axially slidable relative to the sleeve 7.1 or to the housing 2 in such a way that it can be positioned from a first sliding position, as shown in FIGS. 1 and 2, into a second sliding position, in which the release ring 7.3 is pushed further into the receiving space 3 in the insertion direction of the pipe section 4. By axially pressing or moving the release ring 7.3, the claws 5.1 of the fixing members 5 are reversibly deformed in the insertion direction, i.e. in the direction of the stop 3.1 of the housing 2, and are thereby disengaged from the wall of the pipe section 4, so that the pipe section 4 can be pulled out.

It is understood that alternative clamping or fixing mechanisms or methods can also be employed.

Figure 3:
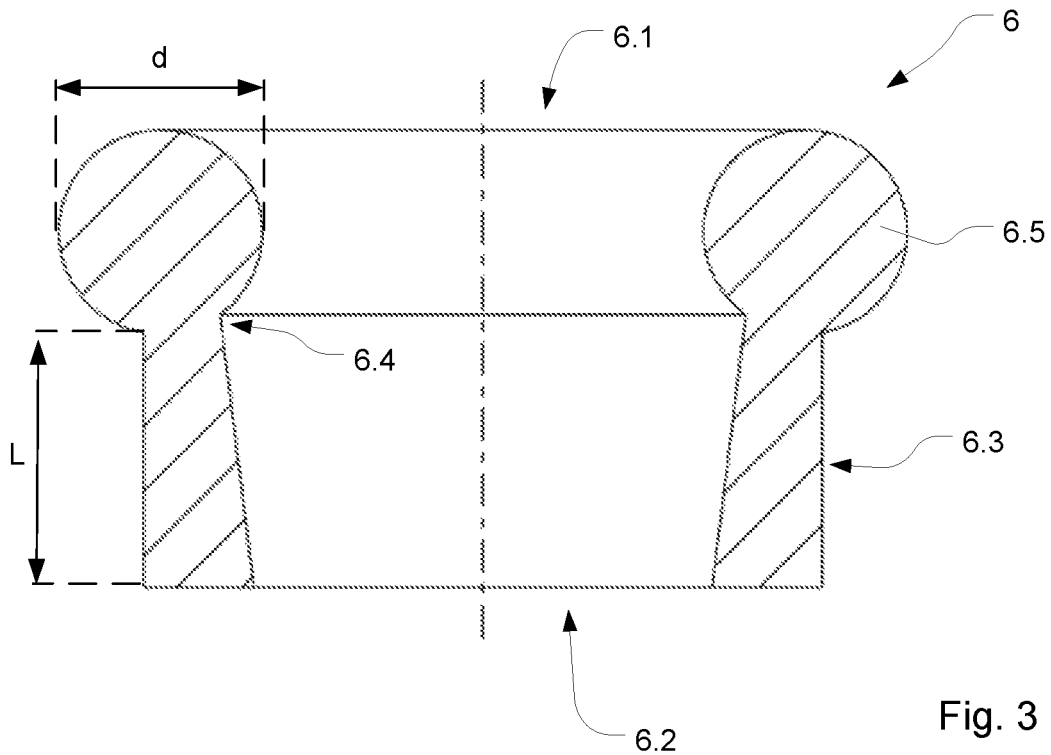
FIG. 3 shows, by way of example, a longitudinal sectional view of a sealing element for use in a pipe coupling.

The sealing element 6 of the pipe coupling 1 is designed to minimize the dead space existing in the region of the free end of the pipe section 4. FIG. 3 shows the sealing element 6 in individual depiction, FIG. 1 shows the sealing element 6 which is inserted in the housing 2 without the inserted pipe section 4, and FIG. 2 shows the sealing element 6 inserted in the housing 2 with the inserted pipe section 4.

The sealing element 6 is designed to be preferably rotationally symmetrical or substantially rotationally symmetrical with respect to the longitudinal axis LA.

The sealing element 6 is sleeve-shaped, i.e. designed as a sealing sleeve, and extends from the stop 3.1 in the axial direction over a partial length of the pipe section 4. Since this stop 3.1, as previously explained, also forms the contact surface for the free end of the pipe section 4, a dead space extending externally around the free end of the pipe section 4 is effectively prevented.

The sealing element 6 has a first end 6.1 and a second end 6.2. An annular, circumferential bulge 6.5 is provided at the first free end 6.1. This bulge 6.5 has the shape of an O-ring or substantially the shape of an O-ring, i.e. the bulge 6.5 is circular and has a circular cross-section. Alternatively, the bulge 6.5 can also have other cross-sectional shapes, such as an oval, polygonal, or a cross-sectional shape composed of curves and corners. Adjacent to this bulge 6.5 is a tubular section 6.3. The free end of the tubular section 6.3 facing away from the bulge 6.5 forms the second free end 6.2 of the sealing element 6. The sealing element 6 is formed in one piece, for example as a one-piece injection-molded elastomeric seal. Alternatively, the bulge 6.5 and the tubular section 6.3 can be formed by separate sealing parts, i.e. the sealing element 6 is formed in multiple parts, the bulge 6.5 and the tubular section 6.3 being parts independent of each other, which are inserted individually into the housing 2, for example.

As can be seen in particular in FIGS. 1 and 3, the tubular section 6.3 of the sealing element 6 is of conical design. In particular, the tubular section 6.3 is formed in such a way that it tapers inwardly towards the second end 6.2, i.e. the inner diameter of the tubular section 6.3 decreases from the bulge 6.5 towards the second free end 6.2. As can be seen in particular in FIG. 3, the inside taper of the tubular section 6.3 is achieved in that the wall thickness of the tubular section 6.3 increases towards the second end. Preferably, the outer contour of the tubular section 6.3 is designed in a rotationally symmetrical fashion to the longitudinal axis of the sealing element 6 and, viewed in the axial direction, has a constant radius relative to this longitudinal axis. This shape of the tubular section 6.3 ensures that the pipe section 4 inserted into the sealing element 6 is firmly enclosed, on its free end side, by the sealing element 6 due to its conical shape, so that even if the pipe protruding from the pipe coupling is bent, flowing behind the free end of the pipe section 4 or the sealing element 6 can be effectively prevented.

As can be seen in particular in FIG. 1 and FIG. 3, the bulge 6.5 protrudes both on the outer circumference side and on the inner circumference side relative to the outer and inner contour of the tubular section 6.3, respectively, in a region in the immediate vicinity of the bulge 6.5. This results in a ribbing 6.4 on the sealing element 6 on the inside in the transition area between the bulge 6.5 and the tubular section 6.3, into which bead the material displaced during the insertion of the pipe section can escape. The deformed sealing element 6 can be seen in FIG. 2.

Furthermore, the cross-section of the bulge 6.5 preferably has a diameter d that is smaller than the length L of the tubular section 6.3. This ensures that the sealing element 6 also has sufficient tightness when the pipe is bent.

Figure 4:
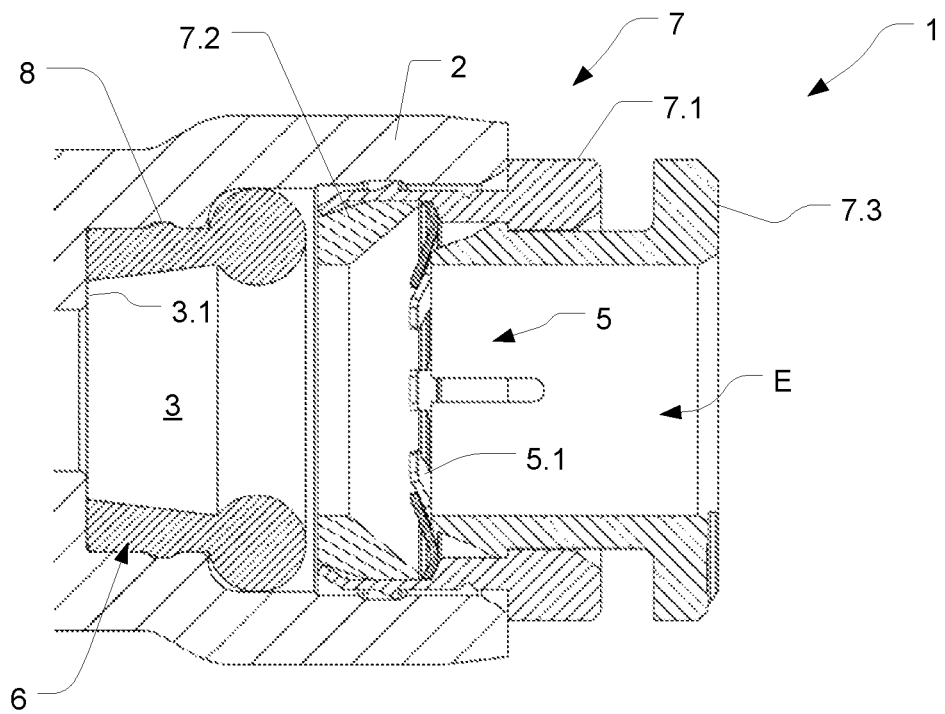
FIG. 4 shows, by way of example, a longitudinal section through a pipe coupling without inserted pipe end, the sealing element having a detent lug.

As can be seen in FIG. 4, a detent lug 8 can additionally be formed on the outer circumference of the tubular section 6.3 of the sealing element 6 in order to fix the sealing element in position relative to the housing 2. The detent lug 8 can be formed, for example, by a bead which runs around the outer circumference and which interlockingly engages in a corresponding recess in the housing 2.

Figure 5:
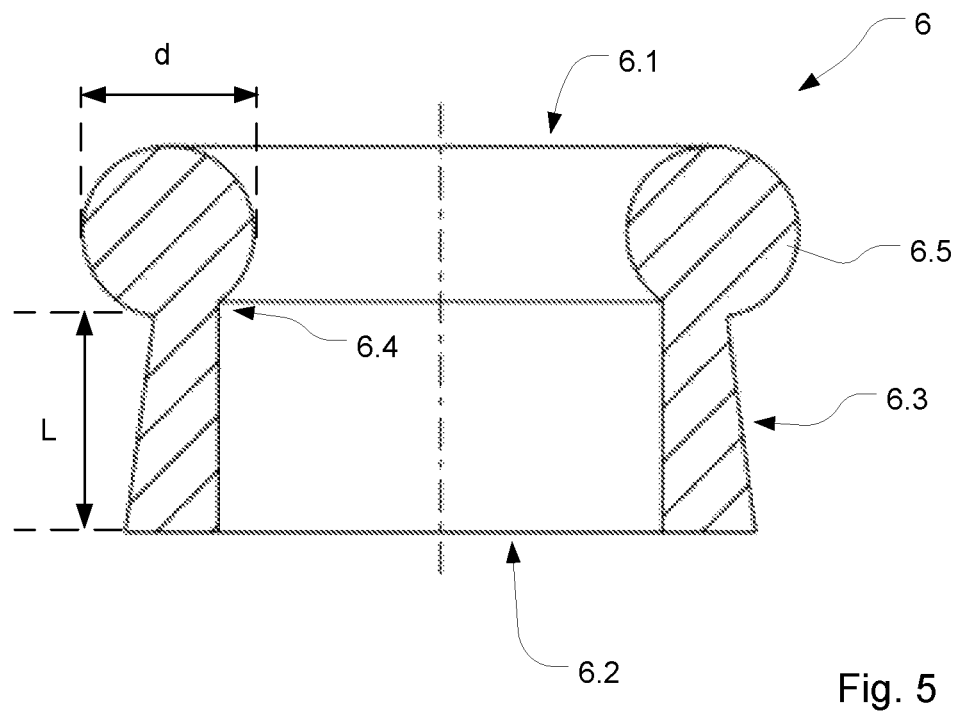
FIG. 5 shows, by way of example, a longitudinal sectional view of a sealing element with a conically expanding outer diameter for use in a pipe coupling.

FIG. 5 shows an alternative embodiment of the sealing element 6. In contrast to the embodiment of the sealing element 6 according to FIG. 3, the tubular section 6.3 expands conically on the outside in the direction of the second free end 6.2 when not installed, i.e. the outer diameter increases in the direction of the free end 6.2. In the non-installed state, the tubular section 6.3 can have a constant or nearly constant diameter on the inside. Preferably, however, the sealing element is radially upset (i.e. compressed) when it is installed in the housing 2 of the pipe coupling 1, so that in the installed state of the sealing element 6 there is a conical taper on the inside towards the second free end.

Figure 6:
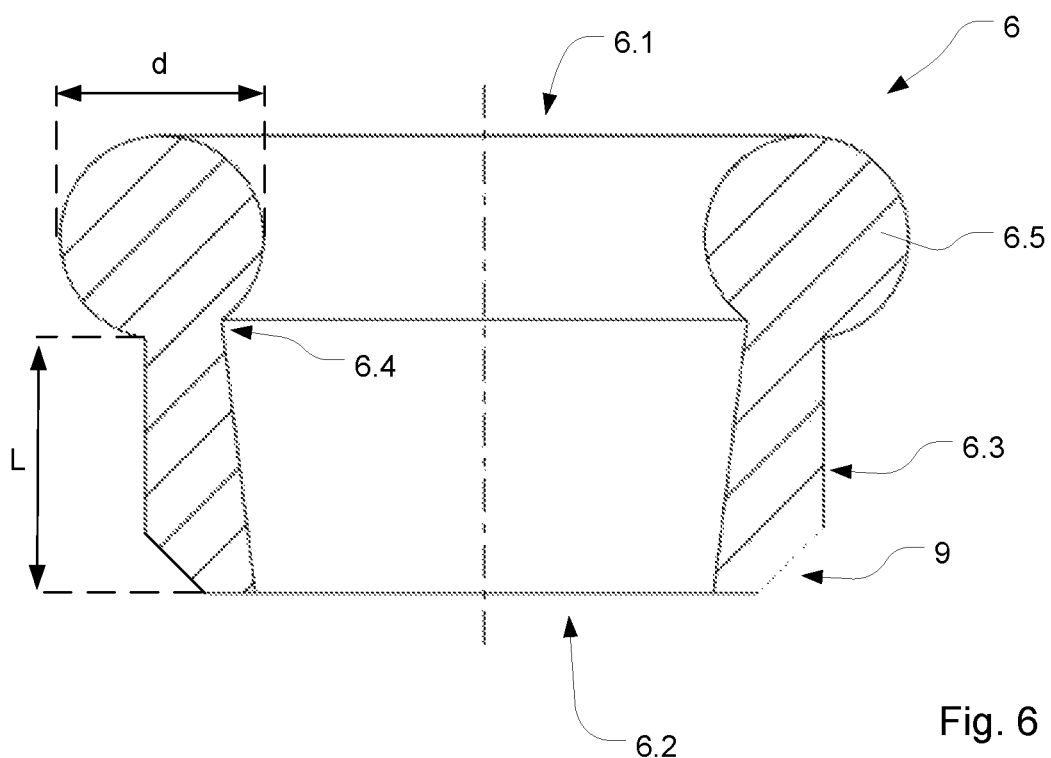
FIG. 6 shows, by way of example, a longitudinal sectional view of a sealing element for use in a pipe coupling, which has an external chamfer in the region of the free end of the tubular section.

FIG. 6 shows an embodiment of the sealing element 6 similar to the embodiment according to FIG. 3. The essential difference to the embodiment according to FIG. 3 is that a chamfer 9 is provided circumferentially on the outside in the region of the second free end 6.2. The chamfer 9 offers the advantage that the tubular section 6.3 of the sealing element 6 can tilt outward on the free end side when the pipe section is inserted into the tubular section 6.3. The outward tilting has the advantage that thereby the contact pressure of the free end of the tubular section 6.3 against the stop 3.1 is increased, so that the tightness at the interface between the stop 3.1 of the housing 2 and the sealing element 6 is increased.

The invention has been described above with reference to exemplary embodiments. It is understood that numerous variations as well as modifications are possible without leaving the scope of protection defined by the claims.

LIST OF REFERENCE SIGNS

1 pipe coupling
2 housing
3 receiving space
3.1 stop
4 pipe section
5 fixing members
5.1 claws
6 sealing element
6.1 first free end
6.2 second free end
6.3 tubular section
6.4 bead
6.5 bulge
7 clamping device
7.1 sleeve
7.2 support ring
7.3 release ring
8 detent lug
9 chamfer
D diameter
E inlet opening
L length of tubular section
LA longitudinal axis The embodiments of the invention in which an exclusive property or privilege is claimed are defined as follows:

1. A pipe coupling, comprising:
a housing with a receiving space for receiving a free end of a pipe section, the receiving space having a first annular stop surface formed by a first radially inward step and a second annular stop surface formed by a second radially inward step;
fixing members arranged in the receiving space for releasably fixing the pipe section in the housing; and
a sealing sleeve arranged in the receiving space and configured to surround an outer circumference of the free end of the pipe section received in the receiving space and thereby seal the interface between the housing and the pipe section in a fluid-tight manner, the sealing sleeve having a first free end and a second free end, wherein the first free end has a bulge with a circular cross-sectional shape defining a diameter, wherein a tubular section protrudes from the bulge and forms the second free end on an edge side,
wherein the diameter of the bulge is greater than a wall thickness of the tubular section in a region immediately adjacent to the bulge, and
wherein, in the installed state of the sealing sleeve before installing the free end of the pipe section:
the tubular section of the sealing sleeve is conically tapered on the inner side towards the second free end and is received in the first radially inward step with the edge side abutting the first annular stop surface; and
the bulge is received in the second radially inward step; and
wherein, in the installed state of the free end of the pipe section, the bulge abuts the second annular stop surface and the free end of the pipe section is received in the receiving space abutting the first annular stop surface, such that the free end of the pipe section and the edge side of the tubular section are located at the same axial position with respect to a longitudinal axis of the housing.

2. The pipe coupling according to claim 1, wherein the bulge has the shape of an O-ring.

3. The pipe coupling according to claim 1, wherein the tubular section has a constant outer diameter in the region of the second free end, viewed in the longitudinal direction.

4. The pipe coupling according to claim 1, wherein the tubular section of the sealing sleeve is held in a clamping manner in the first radially inward step in such a way that:
in an uninstalled state of the sealing sleeve, an outer diameter of the tubular section expands conically towards the second free end viewed in the longitudinal direction; and
in an installed state of the sealing sleeve, the tubular section is radially compressed so that a reduced inner diameter of the tubular section results in the installed state of the sealing sleeve.

5. The pipe coupling according to claim 1, wherein the tubular section is conically tapered on an outside surface towards the second free end.

6. The pipe coupling according to claim 1, wherein the inside conical taper of the sealing sleeve is achieved by a wall thickness of the tubular section increasing towards the second end.

7. The pipe coupling according to claim 1, wherein the tubular section of the sealing sleeve is configured to guide and radially support the free end of the pipe section when the latter is pushed into the receiving space toward the stop surface.

8. The pipe coupling according to claim 1, further comprising a bead on the inside of the sealing sleeve between the bulge and the tubular section.

9. The pipe coupling according to claim 1, wherein the tubular section has at least one detent lug on an outside surface.

10. The pipe coupling according to claim 9, wherein the detent lug is formed by a circumferential bead.

11. The pipe coupling according to claim 1, wherein a length of the tubular section is greater than the diameter of the cross-section of the bulge.

12. The pipe coupling according to claim 1, wherein the sealing sleeve is formed in multiple pieces, having a first sealing sleeve part in the form of the bulge and a second sealing sleeve part in the form of the tubular section.

13. The pipe coupling according to claim 1, further comprising a chamfer or recess on an outside surface of the tubular section in the region of the second free end.

14. The pipe coupling according to claim 1, further comprising a clamping device having a sleeve inserted into the receiving space and a support ring coupled to and at least partially surrounded by the sleeve, wherein the fixing members are arranged between the sleeve and the support ring.

15. The pipe coupling according to claim 14, wherein the clamping device further comprises a release ring inserted in the sleeve, wherein the release ring is axially slidable with respect to the sleeve toward the annular stop surface along the longitudinal axis to release the engagement of the fixing members on the pipe section.

\* \* \* \* \*